US010708428B2

(12) United States Patent
Mezhibovsky et al.

(10) Patent No.: US 10,708,428 B2
(45) Date of Patent: *Jul. 7, 2020

(54) SYSTEM AND METHOD FOR SITE AWARE ROUTING FOR CALLBACK

(71) Applicant: GENESYS TELECOMMUNICATIONS LABORATORIES, INC., Daly City, CA (US)

(72) Inventors: Vladimir Mezhibovsky, San Francisco, CA (US); Nikolay Korolev, Concord, CA (US); Vitaliy Teryoshin, Danville, CA (US); Gregory Duclos, Toronto (CA); Herbert Ristock, Walnut Creek, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/989,859

(22) Filed: May 25, 2018

(65) Prior Publication Data
US 2018/0278749 A1    Sep. 27, 2018

Related U.S. Application Data

(63) Continuation of application No. 15/242,116, filed on Aug. 19, 2016, now Pat. No. 9,986,096.

(51) Int. Cl.
*H04M 3/523* (2006.01)
*H04M 3/51* (2006.01)

(52) U.S. Cl.
CPC ....... *H04M 3/5231* (2013.01); *H04M 3/5175* (2013.01); *H04M 3/5232* (2013.01); *H04M 3/5237* (2013.01)

(58) Field of Classification Search
CPC ............. H04M 3/5231; H04M 3/5175; H04M 3/5232; H04M 3/5237
USPC ....................................... 379/265.11, 210.01
See application file for complete search history.

(56) References Cited

U.S. PATENT DOCUMENTS

| 5,311,574 A | 5/1994 | Livanos |
| 7,302,051 B1 | 11/2007 | Strandberg |
| 2002/0085704 A1 | 7/2002 | Shires |
| 2006/0256949 A1 | 11/2006 | Noble, Jr. |
| 2007/0007331 A1 | 1/2007 | Jasper et al. |
| 2010/0128720 A1 | 5/2010 | Goss |
| 2012/0027197 A1 | 2/2012 | Zgardovski et al. |
| 2014/0133646 A1 | 5/2014 | Ma et al. |
| 2014/0146959 A1 | 5/2014 | Spence et al. |

(Continued)

FOREIGN PATENT DOCUMENTS

KR    1020070012105 A    1/2007

OTHER PUBLICATIONS

Bhulai, S. et al., A Queueing Model for Call Blending in Call Centers, Vrije Universiteit Amsterdam, Amsterdam, The Netherlands, 2003, 11 pages.

(Continued)

*Primary Examiner* — Quynh H Nguyen

(57) ABSTRACT

A system includes a router to route a call to agent stations, processor and a memory. The memory stores instructions, which when executed by the processor, causes the processor to identify the call as a callback, identify an available agent station at a same site as the router if the call is a callback, and establish the callback with the available agent station at the same site as the router where the callback is initiated.

20 Claims, 5 Drawing Sheets

(56) References Cited

U.S. PATENT DOCUMENTS

| | | | |
|---|---|---|---|
| 2014/0161249 A1* | 6/2014 | Tolksdorf | H04M 3/523 |
| | | | 379/266.1 |
| 2015/0358834 A1 | 12/2015 | Cronin | |
| 2016/0127555 A1 | 5/2016 | Hanson et al. | |
| 2016/0337403 A1 | 11/2016 | Stoops et al. | |
| 2017/0223189 A1* | 8/2017 | Meredith | H04M 3/5233 |

OTHER PUBLICATIONS

Bhulai, S., et al., A Queueing Model for Call Blending in Call Centers, IEEE Transactions on Automatic Control, vol. 48, No. 8, 2003, 1434-1438.

International Search Report and Written Opinion for Application No. PCT/US2017/047685, dated Nov. 24, 2017, 13 pages.

Koole, G. et al., Approximate Dynamic Programming in Multi-Skill Call Centers, INFORMS San Francisco, Nov. 14, 2005, 11 pages.

\* cited by examiner

| Agent Station | Site | Primary Skill | Secondary Skill |
|---|---|---|---|
| 1 | A | a | b |
| 2 | A | b | a |
| 3 | B | b | a |
| 4 | B | b | a |
| 5 | B | c | d |

Figure 4

SYSTEM AND METHOD FOR SITE AWARE ROUTING FOR CALLBACK

CROSS-REFERENCE TO RELATED APPLICATIONS

This application is a continuation of U.S. patent application Ser. No. 15/242,116, filed on Aug. 19, 2016, now U.S. Pat. No. 9,986,096, the content of all of which are incorporated herein by reference.

BACKGROUND

Contact centers can handle sales, service and technical support for businesses offering products and or services to their customers and potential customers. In certain circumstances a customer may be offered a callback instead of waiting on the phone for an agent to become available.

BRIEF DESCRIPTION OF THE DRAWINGS

In association with the following detailed description, reference is made to the accompanying drawings, where like numerals in different figures can refer to the same element.

FIG. 4 is a block diagram of an example representation of skills of the agents at the stations.

DETAILED DESCRIPTION

A system and method for contact centers can reduce inter-site traffic and cost, for example, by handing voice callbacks at determined contact center sites. For example, the determined contact center site can be the site that the callback was originally launched from. For customers ordered callbacks and callback sites, sites have a callback queue and agent group. There may be a dedicated agent group for callbacks, or the same agents can serve both incoming calls and callbacks. In some examples, there may be two or more levels of queues: a central callback queue and local blended queues with mixed virtual callback waiting to be made and real incoming calls on hold. A real call can be converted into callback, e.g., if the customer waiting in queue accepted a callback offer. The resulting callback can be first put into the central callback queue trying to preserve the place it had previously. Thereafter, the callback can be moved to the local blended queue of the site with highest chance to be served from fastest. Theses callbacks can be referred to as 'as soon as possible' callbacks. When the callback advances close enough to the top of the local queue the callback is dialed. The callback can be dialed from the site the queue belongs to. Once customer picks up the callback, the callback can again become again a real call waiting for routing to an agent. There may be also scheduled callbacks, which are inserted in the blended queue at determined times and processed as described above.

Callbacks are dialed from one of the sites to customer. If the callback is answered by the customer, the callback is connected to an agent from group, which provides a call path. Currently, a voice callback dialed from a site may not necessarily be located in a queue of the site. The callback can be in some other queue. If a router on site decides to dial the callback from a site different than the site of the router, the callback path can have a cost. Assuming that connections have the same costs, some call legs can be prohibited or have very high costs. To avoid prohibited and/or high cost connections, a callback can be dialed using agents from a site of the router. An objective is to dial the callback from the site with a highest chances that the finally selected agent belongs to this site. At the time the callback is dialed the agent may not have been selected. The agent selection can happen when the callback is successfully connected to the customer. If the customer does not answer the call the callback attempt can be canceled without utilizing agents resources.

Figure 1:
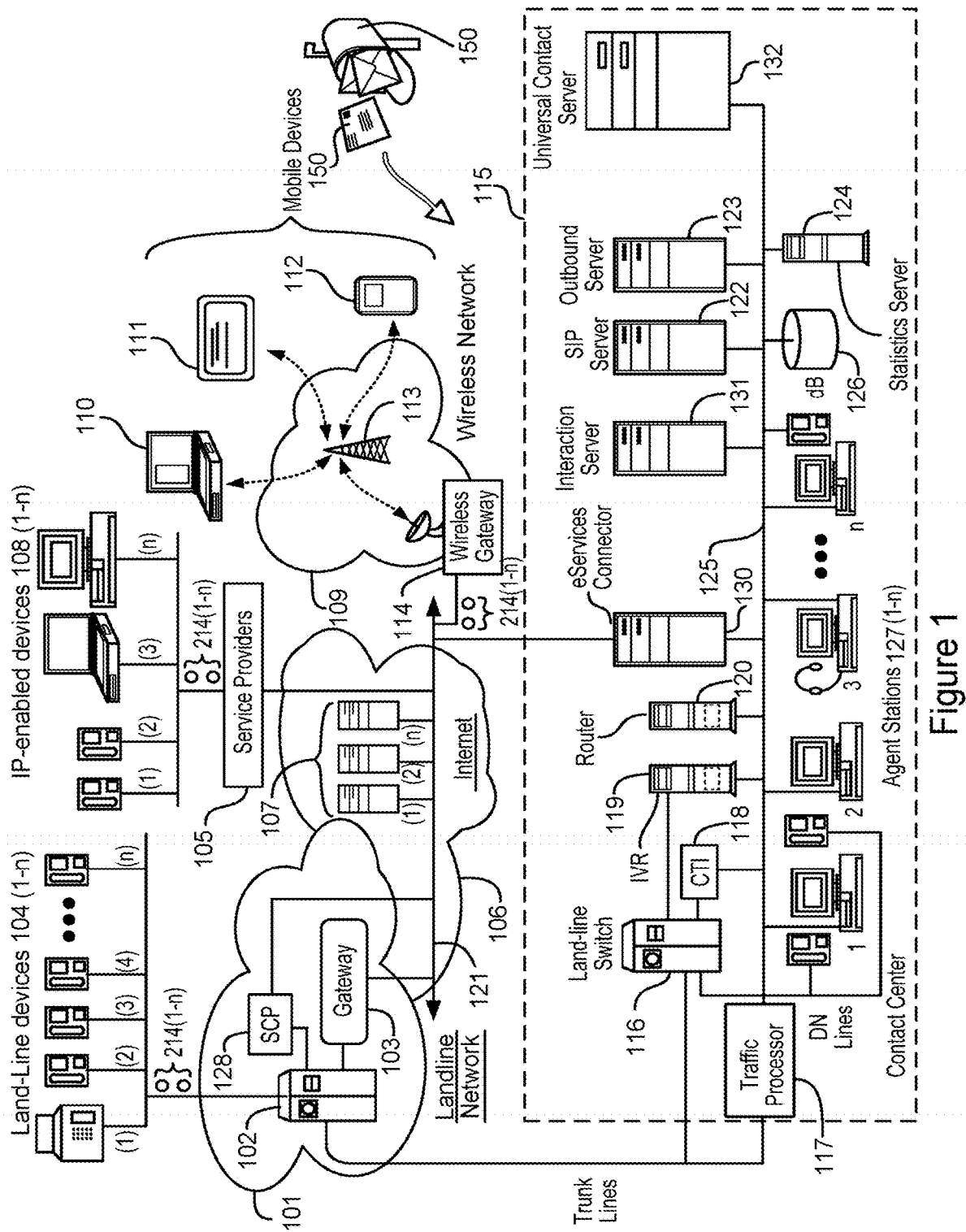
FIG. 1 is a block diagram illustrating an example contact center and a plurality of networks with interconnections where customers and agents may interact via a contact center.

FIG. 1 is a block diagram illustrating an example contact center 115 and a plurality of networks 101, 106, 109 with interconnections where customers and agents may interact via the contact center 115. Contact center 115 can be hosted by an enterprise that employs one or more contact centers. Customers and agents may perform interactions 100(1-n) with the contact center 115. The term customers includes potential customers and other users of the contact center 115. The agents can interact with the customers via agent stations 127(1-n). The agent stations 127(1-n) can be located at two or more sites, where sites located remotely from each other includes sites that are geographically separated from each other, e.g., in different buildings, in different states, in different countries, in different continents, etc. The customers can use one or more communication appliances to contact the agent stations 127(1-n), including but not limited to land-line devices, e.g., telephones and facsimile machines 104 (1-n), IP-enabled devices 108 (1-n), through mobile appliances 110, 111 or 112, through the postal mail 150, etc. The interaction server 131 can serve interactions 100(1-n), e.g., digital media including email, chat, co-browse, social media, etc., to agents based on priority, e.g., via gold, silver, bronze and/or other service level agreements (SLA's), in which higher priority interactions 100(1-n) are served first. This can also apply to the Session Initiation protocol (SIP) Server 122 and CTI 118 (also known as a T-Server), described below, for handling voice traffic. Sometimes the contact center 115 can offer the customer a voice callback instead of the customer staying on the line until an agent station 127(1-n) is available.

Persons interacting through land-line devices 104 may connect firstly over trunk lines to a network switch 102. Switch 102 may interact with hardware and software of a service control point (SCP) 128, which may execute intelligent operations to determine to connect an incoming call to different ones of possible contact centers or to route an incoming call and facsimiles to an agent in a contact center or to an agent operating as a remote agent outside a contact center premises. Incoming calls and facsimiles in some circumstances may also be routed through a gateway 103 into the Internet network 106 as packet-switched calls. The interconnections in the Internet are represented by backbone 121. In this circumstance a call may be further processed as a packet-switched IP call. Equipment providing SCP services may also connect to the Internet and may allow SCP functionality to be integrated with Internet-connected servers and intelligence at contact centers.

A call from a land-line device 104 connecting to switch 102 may be routed to contact center 115 via trunk lines as shown to either a land-line switch 116 in contact center 115 or to a traffic processor 117. A contact center 115 may operate with the land-line switch 116 or the traffic processor, but in some circumstances may employ both incoming paths. Traffic processor 117 may provide session border controller (SBC) functionality, and may operate as a media gateway, or as a softswitch, e.g., a software switch.

Persons interacting through IP-enabled devices **108(1-*n*) may interact through the Internet network via backbone 121, enabled by a variety of service providers 105 which operate to provide Internet service for such devices. Devices 102(1) and 102(2) may be IP-enabled telephones, operating under a protocol such as SIP. Appliance 108(3) is illustrated as a lap-top computer, which may be enabled by software for voice communication over packet networks such as the Internet, and may also interact in many other ways, depending on installed and operable software, such as SKYPE or other VoIP solutions based on technologies such as WEBRTC. Similarly appliance 108(*n*) illustrated as a desk-top computer, may interact over the Internet in much the same manner as laptop appliance 108(3)**.

Many IP-enabled devices provide capability for customers to interact both in voice interactions **100(1-*n*) and text interactions 100(1-*n*), such as email and text messaging services and protocols. Internet network 106 may include a great variety of Internet-connected servers 107 and IP-enabled devices with Internet access may connect to individual ones of such servers to access services provided. Servers 107 in the Internet may include email servers, text messaging servers, social networking servers, Voice over IP servers (VoIP), and many more, many of which customers may leverage in interaction with a contact center such as contact center 115**.

Another arrangement by which customers and agents may interact with contact centers is through mobile devices, illustrated in FIG. 1 by devices 110, 111 and 112. Such devices may include, but are not limited to, laptop computers, tablet devices and smart telephones. Such devices are not limited by a land-line connection or by a hard-wired Internet connection as shown for land-line devices 104 or IP-enabled devices 108, and may be used by customers and agents from changing geographic locations and while in motion. Devices 110, 111 and 112 are illustrated in FIG. 1 as connecting through a wireless network 109, which may occur through individual ones of cell towers 113 associated with base stations having gateways such as gateway 114 illustrated, the gateways connected to Internet backbone 121.

In some circumstances mobile devices, e.g., devices 110, 111 and 112, may connect to supplemental equipment. For example, cellular smartphones may be enabled for near-field communication such as BLUETOOTH, and may be paired with equipment in an automobile, which may in turn connect to the Internet network through satellite equipment and services, such as ON-STAR. Wireless communication may be provided as well in aircraft, which may provide an on-board base station, which may connect wirelessly to the Internet through either a series of ground stations over which an aircraft may pass in flight, or through one or more satellites.

Regardless of the variety of ways that Internet access may be attained by mobile devices, users of these devices may leverage Internet-connected servers for a great variety of services, or may connect through the Internet more directly to a contact center such as contact center 115, where users may interact as customers or as agents of the contact center.

The contact center 115 may represent one of a plurality of federated contact centers, a single center hosted by a single enterprise, a single contact center operating on behalf of a plurality of host enterprises, or any one of a variety of other arrangements. Architecture of an individual contact center 115 may also vary, and not all variations may be illustrated in a single diagram such as FIG. 1. The architecture and interconnectivity illustrated in FIG. 1 is exemplary.

Equipment in a contact center such as contact center 115 may be interconnected through a local area network (LAN) 125. Land-line calls may arrive at a land-line switch 116 over trunk lines as shown from land-line network 101. There are a wide variety of land-line switches such as switch 116, and not all have the same functionality. Functionality may be enhanced by use of computer-telephony integration (CTI), which may be provided by a CTI server 118, which may note arriving calls, and may interact with other service units connected to LAN 125 to route the calls to agents connected to LAN 125, or in some circumstances may route calls to individual ones of remote agents who may be using any of land-line devices 104, IP-enabled devices 108 or mobile devices represented by devices 110, 111 or 112. The CTI server 118 can be implemented with a GENESYS TELECOMMINATION SYSTEMS, INC. T-server. Calls may be queued in any one of a variety of ways before connection to an agent, either locally-based or remote from the contact center, depending on circumstances.

Incoming land-line calls to switch 116 may also be connected to an IVR server 119, which may serve to ascertain purpose of the caller and other information useful in further routing of the call to final connection, if further routing is needed. A router 120 may be leveraged for routing intelligence, of which there may be a great variety, and for association of the instant call with previous calls or future calls that might be made. The router 120 can be mapped to a GENESYS TELECOMMINATION SYSTEMS, INC. orchestration routing server, a universal routing server (URS) and/or a conversation manager.

Land-line calls thusly treated may be connected to agents at agent stations 127(1) or 127(2), each of which is shown as comprising a land-line telephone connected to switch 116 by destination number (DN) lines. Such calls may also be connected to remote agents using land-line telephones back through the land-line network. Such remote agents may also have computing appliances connected to contact center 115 for interaction with agent services such as scripting through an agent desktop application, also used by agents at agent stations 127. Agent station 127(3) is illustrated as having a connected headset from a computing device, which may execute telephony software to interact with packet switched calls. Agent station **127(*n*) is illustrated as having an IP-enabled telephone connected to LAN 125, through which an agent at that station may connect to packet-switched calls. Agent stations 127(1-*n*)** may have a computerized appliance executing software to enable the using agent to transact by voice, email, chat, instant messaging, and any other known communication process.

Incoming calls from land-line network 101 may alternatively be connected in contact center 115 through Traffic Processor 117, described briefly above, to LAN 125. In some circumstances Traffic Processor 117 may convert incoming calls to SIP protocol, and such calls may be further managed by SIP Server 122.

Incoming calls from IP-enabled devices 108 or from mobile devices 110, 111 or 112, and a wide variety of text-based electronic communications may come to contact center 115 through the Internet, arriving in the Contact Center at an eServices Connector 130. eServices Connector 130 may provide protective functions, such as a firewall may provide in other architecture, and may serve to direct incoming transactions to appropriate service servers. For example, SIP calls may be directed to SIP Server 122, and text-based transactions may be directed to an interaction server 131, which may manage email, chat sessions, Short Message Service (SMS) transactions, co-browsing sessions, and more.

The interaction server 131 may leverage services of other servers in the contact center, and available remotely as well. For example, SMS and email can be processed by the interaction server 131 and supported by a universal contact server 132 which interfaces with a database to store data on contacts, e.g., customers, including customer profiles and interaction history. The customer profile can include information about a level of service that the customer's interactions 100(1-n) are to receive, e.g., for distinguishing a customer segment (gold/silver/bronze) a particular interaction belongs to.

A statistics server 124 is illustrated in contact center 115, connected to LAN 125, and may provide a variety of services to agents operating in the contact center, and in some circumstances to customers of the contact center. Statistics may be used in contact center management to vary functionality in routing intelligence, load management, and in many other ways. A database dB 126 may be provided to archive interaction data and to provide storage for many of the activities in contact center 115. An outbound server 123 is illustrated and may be used to manage outbound campaigns in the contact center, wherein calls may be made to destinations from a campaign list, and answered calls may be connected directly or be queued to be connected to agents involved in the outbound campaigns.

The contact center 115 and connectivity of the networks 101, 106, 109 through which transaction is accomplished between customers and agents is exemplary, and there are a variety of ways that similar functionality might be attained with somewhat different architecture. The architecture illustrated is exemplary.

Contact centers may operate with a wide variety of media channels for interaction between agents and customers who call in to the centers. Such channels may enable voice interaction in some instances, and in other instances text-based interaction, which may include chat sessions, email exchanges, and text messaging. Mail and email are examples of interactions 100(1-n) for an agent to engage in some particular future or scheduled time.

Figure 2:
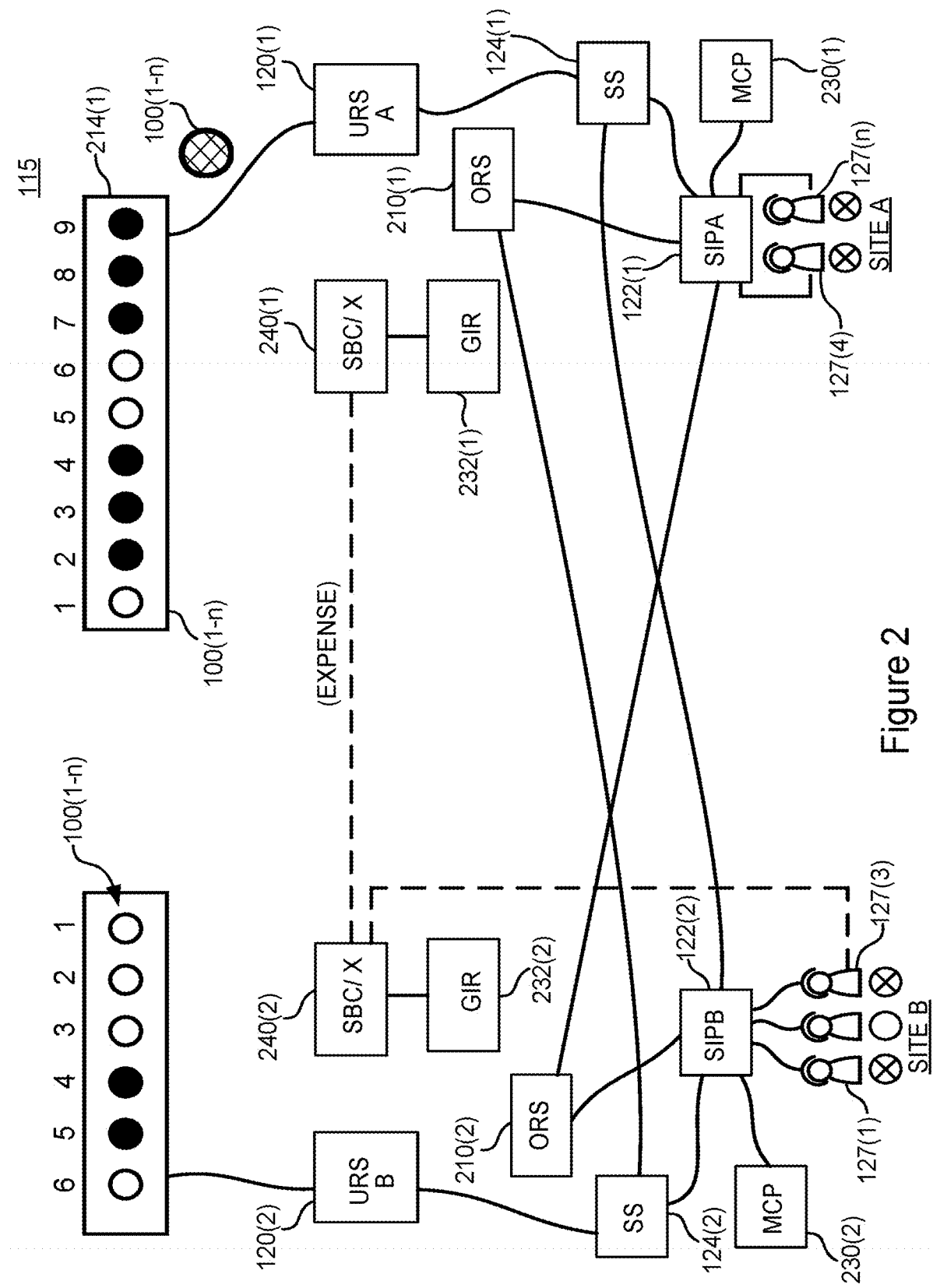
FIG. 2 is a block diagram of an example architecture of the contact center for queuing interactions to agent stations.

FIG. 2 is a block diagram of an example architecture of the contact center 115, or multiple contact centers, for queuing interactions 100(1-n) to agent stations 127(1-n). The agents of the agent stations 127(1-n) can be grouped by site, e.g., site A, site B, etc. Two sites, A and B, are shown for the sake of explanation, but more than two sites can be used. Within the sites, the agent stations 127(1-n) can be linked to a particular skill. For example, in the banking context some skills include, but not limited to, bank loans, credit cards, billings, a language, etc. In some embodiments, the site A or B of the agent station 127(1-n) can be included as a skill of the agent station 127(1-n). In some embodiments, agents of the agent stations 127(1-n) may be linked to a primary skill and a secondary skill, as described in more detail below. The IVR server 119 can instruct the routers 120(1-n) to route incoming calls to an available agent station 127(-n) that includes the skills required for the incoming call, for example, as determined by the IVR 119 from querying the incoming call before the call is routed. Placement of a call to the IVR 119 may also be done through routing, e.g., for IVR behind switch architectures. The IVR 119 can also be positioned in front of the land-line switch 116, and in this case transfer to the IVR 119 can be controlled through logic of the SCP 128, for example.

The agent stations 127(1-n) are served interactions 100 (1-n) by the routers 120(1-n) as the interactions 100(1-n) make their way through the queues 214(1-n). The interactions 100(1-n) can make their way through the queues 214(1-n) as inbound calls (shown by solid circles), virtual interactions representing voice callback requests (shown by empty circles), and real interactions created to replace a virtual interaction, e.g., when the customer answers a callback (shown by cross-hatching). In some embodiments, the router 120(1-n) drives the ORS 210(1-n) to remove the interactions 100(1-n) from the queues 214(1-n) generally based on first in, first out (FIFO). The router 120(1-n) can determine when an agent station 127(1-n) is, or is about to become, available. For voice callback interactions, the router 120(1-n) can also instruct the ORS 210(1-n) to serve the callback to an agent station 127(1-n) at the same site A or B as the router (1-n) launching the call. For example, for site A, the router 120(1) can drive ORS 210(1) to launch the callback for connection with an agent station 127(4) or 127(n). The ORS 210(1) instructs the SIP server A 122(1) about which agent station 127(1) or 127(n) to connect the answered callback, e.g., the agent station 127(4) or 127(n) at the same site as the router 120(1). A media control platform (MCP) 230 (1) can be included for handling multimedia type options during the callback. Information about the call, including which site A or B launch the callback, can be saved with the statistics server 124(1) which is connected with the URS A 120(1).

Callback communications to the land-line devices 104(1-n) of the customers can be routed from the SIP servers 122(1-n) to public switched telephone networks (PSTN) 250(1-n) via session border controller (SBC) 240(1-n). The SIP servers 122(1-n) can communicate to the routers 120 (1-n) via T-Library interfaces, or other protocol interfaces. The SIP server 122(1-n) can include corresponding route points (RP) to control routing of the calls to agent stations 127(1-n) and other types of interactions in the contact center 115. In some embodiments, the contact center 115 can store feedback information to the statistics server 124(1-n). In some embodiments, the feedback information can include information about a success rate of connecting agent stations 127(1-n) to voice callbacks on the same site of the callback launching router 120(1), and/or whether or not a primary or secondary skill of the agent at the agent station 127(1-n) was used. Success rate can include whether or not the customer answered the callback, if an agent station 127(1-n) was connected with the answered callback within a determined time, if the callback was dialed from the same site the finally selected agent station 127(1-n) belongs to, and/or by an agent station 127(1-n) at the same site as the router 120(1-n). At least some feedback information can be gathered by GENESYS interaction recording 232(1-n) connected with SBC 240(1-n). The contact center 115 can use the feedback information to adjust a number of voice callbacks initiated from the site A or B, etc., either higher or lower based on how busy the agent stations 127(1-n) are, adjust a number of agent stations 127(1-n) at the site, and/or adjust skills of the agents working at the agent station 127(1-n), etc.

Figure 3:
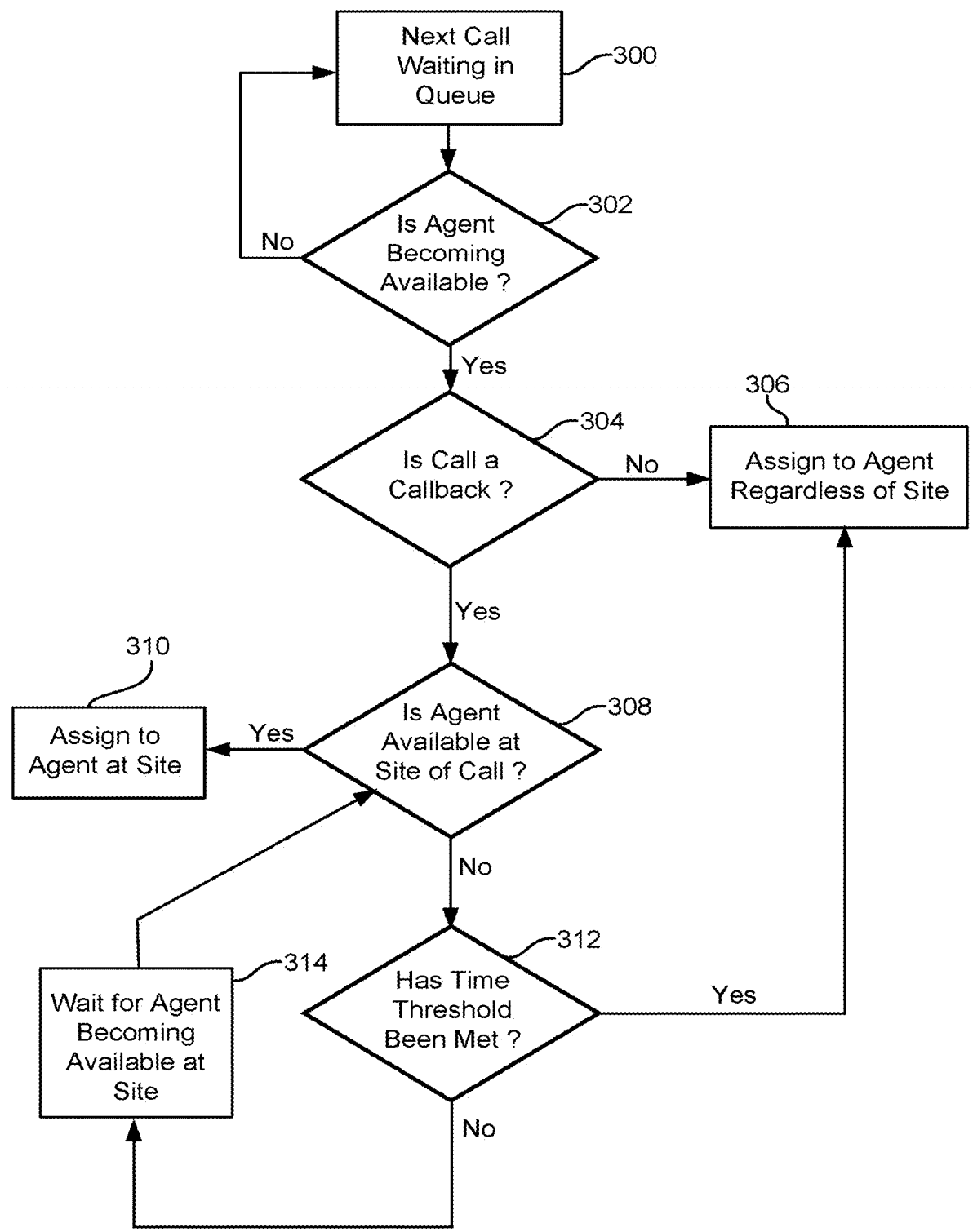
FIG. 3 is a flowchart of an example process for connecting a callback call with agent stations at a same site of the router initiating the callback.

FIG. 3 is a flowchart of an example process for connecting a callback call with agent stations 127(1-n) at a same site of the router 120(1-n) initiating the voice callback. In one example, the callback has been successfully dialed and customer is waiting at the call which is put in queue along with other real calls, whether a callback or not. For all of these calls they can be served by agent stations 127(1-*n*) from the same site. For callback calls the chance of being served by agent stations 127(1-*n*) may be higher because of the determined site selection.

The inbound calls and callbacks can be connected with agent stations 127(1-*n*) based on an order in a FIFO queue 214(1-*n*) (300). Other types of queues can be used. When a call is the next call in the queue 214(1-*n*), the router 120(1-*n*) can determine if an agent station 127(1-*n*) is, or is becoming, available (302). In some embodiments, if the call is not a voice callback (304), the router 120(1-*n*) directs the ORS 210(1-*n*) to assign the call to an agent station 127(1-*n*) regardless of a site of the router 120(1-*n*). In other embodiments, this step is not used and inbound and callback calls are treated the same at this stage. If the call is a voice callback, the router 120(1-*n*) determines if an agent station 127(1-*n*) is available, or is becoming available, at the site of the router 120(1-*n*) of the voice callback (308). If an agent station 127(1-*n*) is available at the site of the voice callback the router 120(1-*n*) directs the ORS 210(1-*n*) to initiate a voice callback to an agent station 127(1-*n*) at the site (310). The ORS 210(1-*n*) instructs the SIP server 122(1-*n*) on which agent station 127(1-*n*) to connect with the call. For example, at site A, router A 120(1) instructs the ORS 210(1) which in turn instructions the SIP server A 122(1) to connect a callback with agent station 127(4) or (*n*) at site A. The voice callback can be routed through SBC 240(1) at site A. The router 120(1-*n*) can instruct the ORS 210(1-*n*) to make more callbacks than agent stations 127(1-*n*) determined to be available, or to become available, based on the router 120(1-*n*) expecting a number of callbacks to not answered. The contact center 115 can track a number of answered callbacks and save the number in the statistics server 124(1), which can be accessed by the URS A 120(1), SIP A 122(1) and statistics server 124(2) at other sites.

If the router 120(1-*n*) determines that an agent station 127(1-*n*) at the site of the router 120(1-*n*) is not available, the router 120(1-*n*) determines if a time threshold has been met, e.g., about 30 seconds to about 120 second, based on an implementation (312). In some embodiments, the time threshold can be established by an SLA. If the time threshold has not been met, the router 120(1-*n*) waits for agent station 127(1-*n*) to become available at the site of the router 120(1-*n*) (314). If the time threshold has been met, the router 120(1-*n*) instructs the ORS 210(1-*n*) to assign the callback to an agent station 127(1-*n*) regardless if the agent station 127(1-*n*) is at the same site of the router 120(1-*n*), or not (306). In this way the callback connection to the agent 127(1-*n*) may be expedited since the agent stations 127(1-*n*) at the same site of the router 120(1-*n*) appear to be busy, and to help reduce the chances that the customer runs out of patience and hangs up the callback. The ORS 210(1-*n*) sends a dialing notification to the SIP server 122(1-*n*) to connect the next call in the queue to the agent station 127(1-*n*). In some embodiments, the router 120(1-*n*) can inform the ORS 210(1-*n*) of the name of the selected SIP server 122(1-*n*) after the voice callback is connected to customer by updating data on the callback when the call becomes routable. The router 120(1-*n*) can wait for the local agent station 127(1-*n*) to become available for a configurable time before the router 120(1-*n*) considers agent stations 127(1-*n*) located remotely from the router 120(1-*n*). Additionally or alternatively, in some embodiments router 120(1-*n*) predicts where the agent stations 127(1-*n*) are going to become available when the router instructs the ORS 210(1-*n*) to control the start of the dialing. The router 120(1-*n*) can determine where agent stations 127(1-*n*) are likely to become available based on the state of the queue 214(1-*n*) and average call handle times, etc. For example, inbound calls can be assigned to particular site while in the queue 214(1-*n*), and the site for callbacks can be picked at time of callback dialing.

In some embodiments, the router 120(1-*n*) can implement a predictive algorithm to determine a probability of successful contact when waiting for an agent station 127(1-*n*) to become available at the same site as the router 120(1-*n*). The router 120(1-*n*) can consider hit rate (probability of an answer by customer), wait time until an answer (call progress detection time), estimated wait time of a callback (how long is the callback going to be in the queue before being answered), patience time of the customer (average time until abandonment of the dialed call). If the probability of a successful contact becomes lower than a threshold, the callback can be routed to a site having an available agent station 127(1-*n*), even if the agent station 127(1-*n*) is located at a site other than the site the call with the customer has been established at.

FIG. 4 is a block diagram of an example representation of different levels of skills of the agents at the stations 127(1-*n*). The router 120(1-*n*) can consider a primary skill and one or more secondary skills of the agents at the agent stations 127(1-*n*) when routing the callback. The router 120(1-*n*) can include the recommended site to connect the callback as a skill in a notification message to the ORS 210(1-*n*). In some embodiments, the contact center 115 can assign agent stations 127(1-*n*) primary skill as "serve calls from local site" (skills A and B); assign to percentage A of agents on site A secondary skill "serve calls from site B" (skill b); assign to percentage B of agents on site B secondary skill "serve calls from site A" (skill a); dynamically optimize these percentages to balance abandonment versus cross-site call expense (for example via an algorithm discussed in "A Queueing Model for Call Blending in Call Centers" by Sandjai Bhulai and Ger Koole, or other algorithm). The router 120(1-*n*) can take the skills into account in routing: route call on site A to skill a, and overflow to a secondary skills can be assigned virtually, e.g., pool/amount of cross-site skills a and b which the router 120(1-*n*) can determine and return, when callback service are ready to launch next call. The router 120(1-*n*) can check current values of skill a (on site B) and skill b (on site A) and call from the site with a higher value. In some embodiments, the contact center 115 can set a preference to agent stations 127(1-*n*) local to the router 120(1-*n*), e.g., using functions like sitex or loc in skill expressions. The functions can be included directly in skill expressions which used as targets in strategies or can be used separately (on top of them) with SetIdealAgent function.

Figure 5:
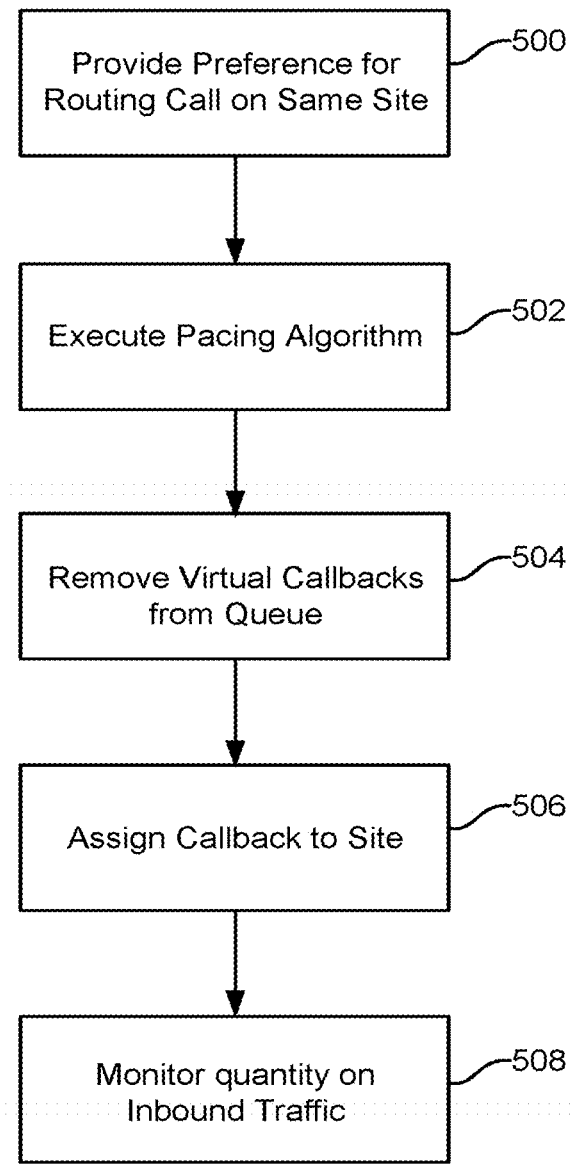
FIG. 5 is a flowchart of another example process for connecting a voice callback call with agent stations at a same site of the router initiating the callback.

FIG. 5 is a flowchart of another example process for connecting a voice callback call with agent stations 127(1-*n*) at a same site of the router 120(1-*n*) initiating the callback. For the sake of explanation, the router A 120(1) on side A is initiating the callback. The same process can be used for the router B 120(2) on site B, or any routers on any other sites. The router A 120(1) can be programmed to select a site from where to dial a callback so that in case of successful contact to a customer the router 120(1) transfers the call to an agent station 127(4) or (*n*), e.g., on the same site A as the router A 120(1) (500). The router A 120(1) can execute a pacing algorithm for determining when to initiate the callback (502). For example, for every determined time interval, e.g., one second, the pacing algorithm provides a number of callbacks that are dialed from site A. Other time intervals can be used. The router A 120(1) can establish real callbacks to be dialed in place of virtual or forecasted callbacks 100(1-*n*) waiting in the queue 214(1) (504). The router A 120(1) can monitor all callback queues 214(1-*n*) on all sites A, B, etc. or a universal queue, depending on an implementation. The router 120(1) can take callbacks from the queues 214(1-*n*) according to established rules, for example, by taking the longest waiting virtual callback in a queue, one by one. In some embodiments, the rules can be established by SLA's. The router A 120(1) assigns the callback to site A to satisfy the preference for same site callback for this site A (506). The router 120(1) notifies the ORS 210(1) to connect the callback to agent stations 126(4) or (*n*) on site A.

Routers 120(1-*n*) on the sites A, B etc. dial voice callbacks. If there are enough total number of voice callbacks in the system, callback predictions for each site can be executed to optimize the goal of performing callbacks from the same site as the router 120(1-*n*). The routers 120(1-*n*) can use current and historical statistics to provide pacing optimization. Predictive pacing can use statistics including: a) total number of agent statins 127(1-*n*), b) hit rate, c) average handling time, etc. Other factors can include one or more of a number of ready agent stations 127(1-*n*), b) a number of pending calls (calls that were dialed but not answered yet), etc. The pacing algorithm can help ensure that a call abandonment rate is not exceeded, e.g., due to the customer waiting too long for the agent station 127(1-*n*) to answer.

For every agent station 127(1-*n*) there can be a queue of calls waiting to be answered, e.g., that can be routed to the agent station 127(1-*n*). When the agent station 127(1), for example, becomes ready for a callback, the router 120(1-*n*) can create a temporary queue of calls waiting for agent station 127(1-*n*) (in priority, waiting time, etc. order) and the agent station 127(1-*n*) answers the call. After the call is found (or not found) the temporary agent station 127(1) queue dissolves. The router 120(1-*n*) can trigger a dialing notification for the voice callback when the callback becomes first in an agent station 127(1-*n*) queue at the same site of the router 127(1-*n*). Under high load, the callback can be dialed prior to reaching the first position, e.g., top, of the queue. If the agent station 127(1-*n*) is not at the same site as the router 127(1-*n*), e.g., which can be indicated by a dial notification from the router 120(1-*n*), the agent station 127(1-*n*) can avoid taking the callback, unless wait time threshold is exceeded.

In some embodiments, routers 120(1-*n*) can monitor an amount of inbound traffic compared to available agent stations 127(1-*n*) at the site. The router 120(1-*n*) can compensate for sub-optimal inbound call distribution by adjusting voice callback site allocation accordingly. For example, if the router 120(1-*n*) determines that its site is receiving less inbound traffic than available agent stations 127(1-*n*), the router 120(1-*n*) can increase the amount of callbacks that are taken from the queue 214(1-*n*) (508). Conversely, the router 120(1-*n*) for a particular site can decrease the amount of callbacks that are taken from the queue 214(1-*n*) if inbound traffic is increasing compared to the available agents 127(1-*n*) at the site. Such pacing can help reduce a wait time of the inbound calls. Other factors that the router 120(1-*n*) can consider when dialing the call include, but are not limited to agent proficiency, language skills, SLA objectives that "80% of established callbacks are answered in 10 seconds," etc. Depending on the cost/benefit values of serving callbacks from the same or different locations as the router 120(1-*n*), the contact center 115 can determine an optimum limit of allowing cross site routing.

The systems and methods described above may be implemented in many different ways in many different combinations of hardware, software, firmware, or any combination thereof. In one example, the systems and methods can be implemented with a processor and a memory, where the memory stores instructions, which when executed by the processor, causes the processor to perform the systems and methods. The processor may mean any type of circuit such as, but not limited to, a microprocessor, a microcontroller, a graphics processor, a digital signal processor, or another processor. The processor may also be implemented with discrete logic or components, or a combination of other types of analog or digital circuitry, combined on a single integrated circuit or distributed among multiple integrated circuits. All or part of the logic described above may be implemented as instructions for execution by the processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. A product, such as a computer program product, may include a storage medium and computer readable instructions stored on the medium, which when executed in an endpoint, computer system, or other device, cause the device to perform operations according to any of the description above. The memory can be implemented with one or more hard drives, and/or one or more drives that handle removable media, such as diskettes, compact disks (CDs), digital video disks (DVDs), flash memory keys, and other removable media.

The systems and methods can also include a display device, an audio output and a controller, such as a keyboard, mouse, trackball, game controller, microphone, voice-recognition device, or any other device that inputs information. The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above. The systems and methods can be implemented over a cloud, for example using AMAZON AWS and other products or services.

While various embodiments have been described, it can be apparent that many more embodiments and implementations are possible. Accordingly, the embodiments are not to be restricted.

The invention claimed is:
1. A system, comprising:
  a processor and a memory, where the memory stores instructions that, when executed by the processor, cause the processor to:
    identify a voice callback request;
    determine that a callback call is to be initiated for the voice callback request;

predict a first likelihood that a first agent associated with a first agent station will be available for handling the callback call, the first agent station being associated with a first call server located at a first geographic site same as the first geographic site of the first agent station;

predict a second likelihood that a second agent associated with a second agent station will be available for handling the callback call, the second likelihood being lower than the first likelihood, the second agent station being associated with a second call server located at a second geographic site same as the second geographic site of the second agent station;

select the first agent as the predicted agent based on the prediction;

identify a geographic site associated with the first agent station;

select the first call server from among the first and second call servers based on the identifying the geographic site associated with the first agent station;

initiate the callback call via the first call server; and establish the callback call with the first agent station at the same first geographic site as the first call server where the callback call is initiated.

2. The system of claim 1, wherein the instructions further cause the processor to identify the first agent as being available, wherein the identifying occurs within a set time threshold.

3. The system of claim 1, wherein the instructions further cause the processor to:

identify a second callback call;

determine that the first agent is unavailable;

wait for the first agent to become available within a time threshold;

in response to determining that the first agent does not become available within the time threshold, establish the second callback call with an agent station at a different site than the site of the first call server.

4. The system of claim 1, wherein the first call server is an orchestration server configured to establish the callback call with the first agent station.

5. The system of claim 1, wherein the instructions further cause the processor to monitor a success rate of customer answered callbacks.

6. The system of claim 5, wherein the instructions further cause the processor to adjust a number of callbacks based on the success rate.

7. The system of claim 1, wherein the instructions further cause the processor to identify whether the first agent station will become available.

8. The system of claim 1, wherein the instructions further cause the processor to consider a primary and a secondary skill of the first agent of the first agent station before establishing the callback call with the first agent station.

9. The system of claim 1, wherein the instructions further cause the processor to optimize pacing of future callback calls based on establishing the callback call with the first agent station at the same site as the first call server.

10. The system of claim 9, wherein the instructions further cause the processor to monitor inbound call traffic to optimize pacing.

11. A method, comprising:

identifying, by a processor, a voice callback request;

determining, by the processor, that a callback call is to be initiated for the voice callback request;

predicting, by the processor, a first likelihood that a first agent associated with a first agent station will be available for handling the callback call, the first agent station being associated with a first call server located at a first geographic site same as the first geographic site of the first agent station;

predicting, by the processor, a second likelihood that a second agent associated with a second agent station will be available for handling the callback call, the second likelihood being lower than the first likelihood, the second agent station being associated with a second call server located at a second geographic site same as the second geographic site of the second agent station;

selecting, by the processor, the first agent as the predicted agent based on the prediction;

identifying, by the processor, a geographic site associated with the first agent station;

select the first call server from among the first and second call servers based on the identifying the geographic site associated with the first agent station;

initiating, by the processor, the callback call via the first call server; and establishing, by the processor, the callback call with the first agent station at the same first geographic site as the first call server.

12. The method of claim 11, further comprising identifying the first agent as being available, wherein the identifying occurs within a set time threshold.

13. The method of claim 11, further comprising:

identifying a second callback call;

determining that the first agent is unavailable;

waiting for the first agent to become available within a time threshold;

in response to determining that the first agent does not become available within the time threshold, establishing the second callback call with an agent station at a different site than the site of the first call server.

14. The method of claim 11, wherein the call server is an orchestration server configured to establish the callback call with the first agent station.

15. The method of claim 11, further comprising monitoring a success rate of customer answered callbacks.

16. The method of claim 15, further comprising adjusting a number of callbacks based on the success rate.

17. The method of claim 11, further comprising identifying whether the first agent station will become available.

18. The method of claim 11, further comprising considering a primary and a secondary skill of the first agent of the first agent station before establishing the callback call with the first agent station.

19. The method of claim 11, further comprising optimizing pacing of future callback calls based on establishing the callback call with the first agent station at the same site as the first call server.

20. The method of claim 19, further comprising monitoring inbound call traffic to optimize pacing.

* * * * *